United States Patent
Han et al.

(10) Patent No.: US 8,204,150 B2
(45) Date of Patent: Jun. 19, 2012

(54) APPARATUS AND METHOD FOR REDUCING PEAK-TO-AVERAGE POWER RATIO IN A WIRELESS COMMUNICATION SYSTEM

(75) Inventors: Seung-Hee Han, Suwon-si (KR); Jong-Hyeuk Lee, Anyang-si (KR); Sang-Boh Yun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 929 days.

(21) Appl. No.: 12/286,597

(22) Filed: Oct. 1, 2008

(65) Prior Publication Data
US 2009/0086848 A1    Apr. 2, 2009

(30) Foreign Application Priority Data
Oct. 1, 2007   (KR) .................. 10-2007-0098868

(51) Int. Cl.
*H04L 27/00* (2006.01)
*H04B 7/02* (2006.01)
(52) U.S. Cl. .................... 375/299; 375/267; 375/297
(58) Field of Classification Search .................. 375/260, 375/267, 295, 296, 297, 299; 370/203, 208, 370/210, 480
See application file for complete search history.

(56) References Cited

U.S. PATENT DOCUMENTS

| | | | |
|---|---|---|---|
| 7,664,192 B2 | 2/2010 | Yun et al. | |
| 2007/0041459 A1* | 2/2007 | Yeon et al. | 375/260 |
| 2008/0187069 A1* | 8/2008 | Qu et al. | 375/295 |
| 2009/0052577 A1* | 2/2009 | Wang | 375/299 |

FOREIGN PATENT DOCUMENTS

KR   10-2006-0031924    4/2006

OTHER PUBLICATIONS

Oh-Ju Kwon, et al.: "Multi-carriers PAPR Reduction Method Using Adaptive Sub-optimal PTS with Threshold", Technical Paper, vol. 26, No. 12A, pp. 2012-2018, May 18, 2001.

* cited by examiner

*Primary Examiner* — Betsy Deppe

(57) ABSTRACT

An apparatus is provided for reducing a peak-to-average power ratio (PAPR) in a wireless communication system having multiple transmit antennas. A symbol generator generates symbols to be transmitted via the multiple transmit antennas, and a PAPR calculator calculates a PAPR value for each symbol. A detector detects a maximum PAPR value among the PAPR values of the symbols. A controller outputs a control signal to reduce a PAPR value of a corresponding symbol when the detected maximum PAPR value exceeds a reference PAPR value. A PAPR reducer reduces the PAPR value of the corresponding symbol upon receipt of the control signal.

20 Claims, 9 Drawing Sheets derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.
APPARATUS AND METHOD FOR REDUCING PEAK-TO-AVERAGE POWER RATIO IN A WIRELESS COMMUNICATION SYSTEM

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Oct. 1, 2007 and assigned Serial No. 2007-98868, the disclosures of which are incorporated herein by reference.

TECHNICAL FIELD OF THE INVENTION

The present invention relates generally to a wireless communication system and, in particular, to an apparatus and method for reducing a peak-to-average power ratio (PAPR) of a signal in a wireless communication system.

BACKGROUND OF THE INVENTION

Orthogonal Frequency Division Multiplexing (OFDM), a scheme for transmitting signals using multiple carriers, is a kind of multi-carrier modulation (MCM) that parallel-converts serial input symbols and modulates each of the parallel-converted symbols with multiple orthogonal sub-carriers before transmission. OFDM is widely applied to digital transmission technologies such as digital audio broadcasting (DAB), digital television (DTV), wireless local area network (WLAN), wireless asynchronous transfer mode (WATM), and so forth. In addition, OFDM is high in frequency efficiency and robust against multi-path fading as it transmits signals while maintaining orthogonality between multiple sub-carriers, thus making it possible to obtain high transmission efficiency.

However, an OFDM-based communication system may suffer from high PAPR due to the multi-carrier modulation. That is, since OFDM transmits data using multiple carriers, the final OFDM signal may experience a significant change in amplitude as the level of its amplitude is a sum of amplitudes of the multiple carriers. In addition, if the multiple carriers are equal even in phase, a level of their amplitudes may have a very large value. Therefore, the amplitudes may deviate from a linear operation range of a high-power linear amplifier, and the signals may undergo distortion when they pass through the high-power linear amplifier.

Meanwhile, a communication system using Multiple Input Multiple Output (MIMO) scheme has a very high channel capacity compared with a communication system using Single Input Single Output (SISO; or single-transmit/receive antenna technology) scheme. Accordingly, the next-generation wireless communication system tends to adopt MIMO (or multi-transmit/receive antenna technology) scheme, and intensive research is being carried out even on MIMO-OFDM scheme, which is a combined scheme of MIMO and OFDM. However, MIMO-OFDM scheme also suffers from high PAPR of signals.

SUMMARY OF THE INVENTION

To address the above-discussed deficiencies of the prior art, it is a primary object of the present invention to address at least the problems and/or disadvantages and to provide at least the advantages described below. Accordingly, an aspect of the present invention is to provide an apparatus and method for reducing a peak-to-average power ratio (PAPR) in a wireless communication system having multiple transmit antennas.

According to one aspect of the present invention, there is provided a method for reducing a peak-to-average power ratio (PAPR) in a wireless communication system having multiple transmit antennas. The method includes generating symbols to be transmitted via the multiple transmit antennas; calculating a PAPR value for each of the generated symbols; detecting a maximum PAPR value among the calculated PAPR values of the symbols; and reducing the PAPR value of the corresponding symbol when the detected maximum PAPR value exceeds a reference PAPR value.

According to another aspect of the present invention, there is provided an apparatus for reducing a peak-to-average power ratio (PAPR) in a wireless communication system having multiple transmit antennas. The apparatus includes a symbol generator for generating symbols to be transmitted via the multiple transmit antennas; a PAPR calculator for calculating a PAPR value for each symbol; a detector for detecting a maximum PAPR value among the PAPR values of the symbols; a controller for outputting a control signal to reduce a PAPR value of a corresponding symbol when the detected maximum PAPR value exceeds a reference PAPR value; and a PAPR reducer for reducing the PAPR value of the corresponding symbol upon receipt of the control signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides an apparatus and method for reducing a peak-to-average power ratio (PAPR) of a signal in a wireless communication system. In particular, the present invention can be preferably applied to at least one of a Multiple Input Multiple Output (MIMO) wireless communication system using multiple antennas, a wireless communication system using Orthogonal Frequency Division Multiplexing (OFDM), and a MIMO-OFDM wireless communication system.

Figure 1:
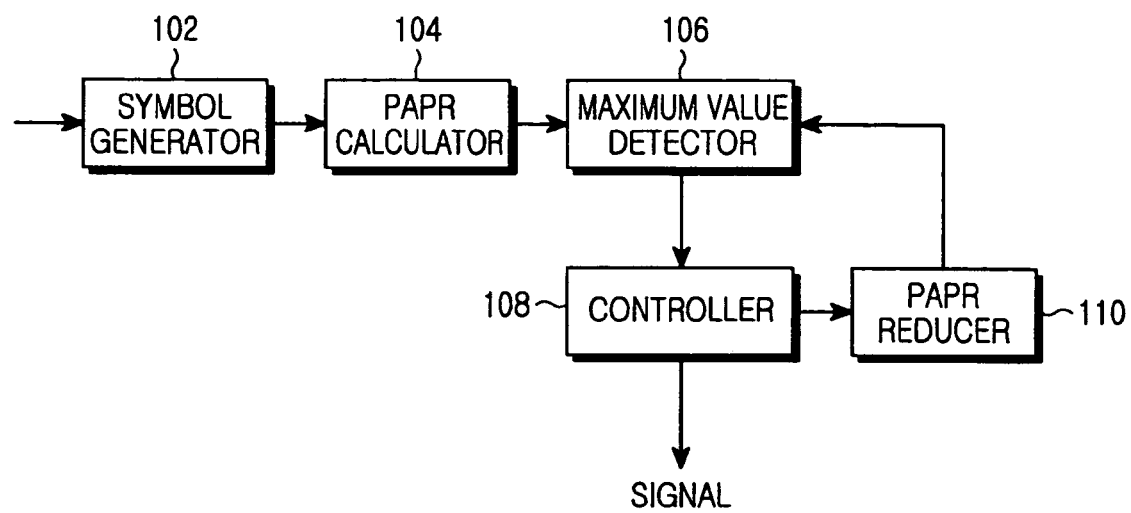
FIG. 1 is a block diagram illustrating a PAPR reduction apparatus according to an embodiment of the present invention.

FIG. 1 is a block diagram illustrating a PAPR reduction apparatus according to an embodiment of the present invention.

Referring to FIG. 1, the PAPR reduction apparatus includes a symbol generator 102, a PAPR calculator 104, a maximum value detector 106, a controller 108, and a PAPR reducer 110.

The symbol generator 102 generates symbols to be transmitted via antennas by encoding and/or modulating input data, and outputs the symbols to the PAPR calculator 104. The PAPR calculator 104 calculates PAPR for the symbols generated for the antennas, and outputs the results to the maximum value detector 106. Herein, the number of the symbol generators 102 and the PAPR calculators 104 can be equal to the number of transmit antennas. That is, when the number of transmit antennas is four, a total of four symbol generators 102 and four PAPR calculators 104 may exist separately for the transmit antennas. The maximum value detector 106 detects a symbol having the maximum PAPR, and outputs the results to the controller 108.

The controller 108 compares the detected maximum PAPR value with a predetermined reference PAPR value, and determines a need to perform PAPR reduction when the detected maximum PAPR value exceeds the reference PAPR value. Therefore, the controller 108 outputs a control signal to the PAPR reducer 110 so as to reduce the PAPR of the corresponding symbol. If the detected maximum PAPR value is lower than or equal to the reference PAPR value, the controller 108 causes the signals to be transmitted. The PAPR reducer 110 reduces the PAPR of the corresponding symbol by applying a technique for reducing the PAPR of the corresponding symbol.

Thereafter, the maximum value detector 106 detects again a symbol having the maximum PAPR value taking the reduced PAPR value into account, and the controller 108 compares the maximum PAPR value of the corresponding symbol with the reference PAPR value. The foregoing operation is repeated until the maximum PAPR value of the symbol is lower than or equal to the reference PAPR value, or repeated a predetermined number of times. If the predetermined number of times is '1', it means as follows: 1) the PAPR reducer 110 performs one time an operation of reducing a PAPR value of the corresponding symbol, 2) the controller 108 performs one time an operation of comparing the maximum PAPR value with the reference PAPR value, or 3) the maximum value detector 106 performs one time an operation of detecting a symbol having the maximum PAPR value. That is, the controller 108, taking into account the reference PAPR value and/or the predetermined number of times, transfers a control signal for PAPR reduction to the PAPR reducer 110, or transfers a control signal for stopping the PAPR reduction operation to the PAPR reducer 110. Alternatively, when the number of PAPR reductions exceeds the predetermined number of times, the controller 108 may transfer no control signal for PAPR reduction to the PAPR reducer 110. Although not illustrated in FIG. 1, the PAPR value reduced by the PAPR reducer 110 and transmission signal are temporarily stored in a buffer, and the maximum value detector 106 can detect again the maximum PAPR value depending on the stored PAPR value.

The technique that the PAPR reducer 110 uses to reduce the PAPR of the corresponding symbol can include a clipping & filtering technique, a selective mapping (SLM) technique, a partial transmit sequence (PTS) technique, an interleaving technique, a tone reservation technique, and so forth.

The clipping and filtering technique is a technique for Inverse Fast Fourier Transform (IFFT)-transforming a signal into a time-domain signal and then clipping the magnitude of the signal below a predetermined value. The reason for clipping the magnitude of the signal below a predetermined value is to satisfy a linear operation range of the amplifier. This clipping technique may increase inter-symbol interference due to the possible occurrence of in-band distortion caused by nonlinear calculation. Therefore, the clipping & filtering technique cancels interference through a filtering process.

The SLM technique and the PTS technique are techniques for adjusting a phase of signals.

Figure 2:
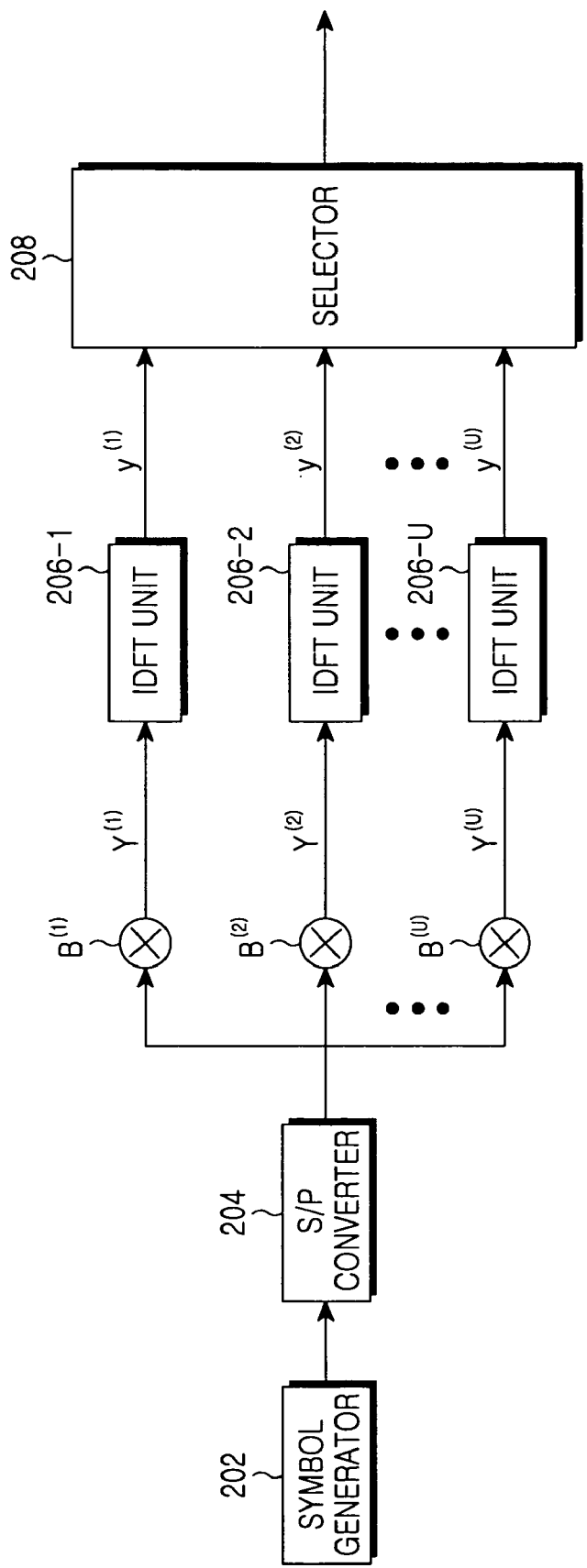
FIG. 2 is a diagram illustrating an apparatus for reducing the PAPR of a signal using an SLM technique according to an embodiment of the present invention.
Figure 3:
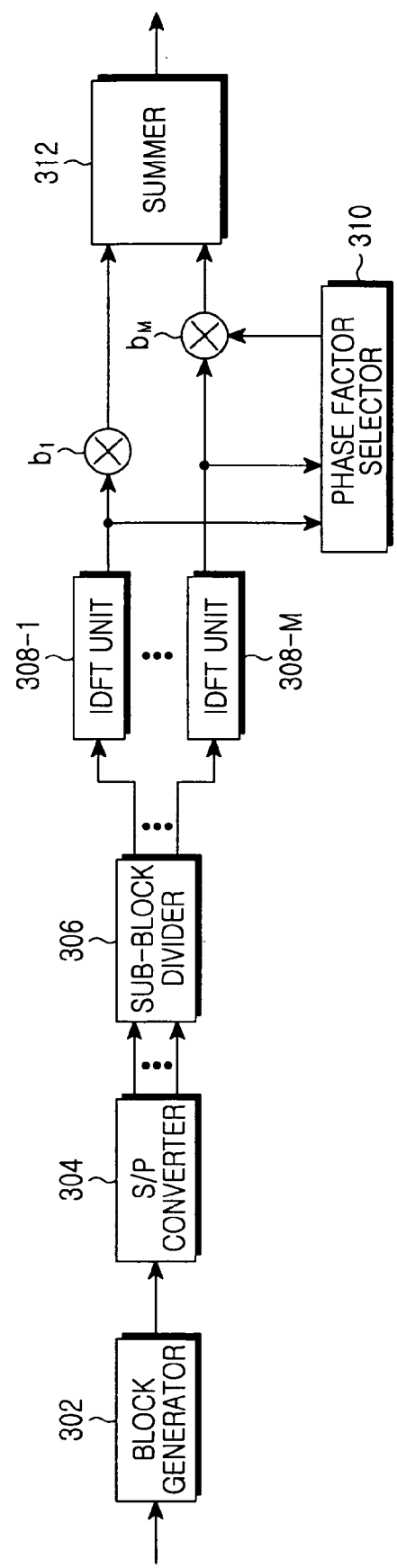
FIG. 3 is a diagram illustrating an apparatus for reducing the PAPR of a signal using a PTS technique according to an embodiment of the present invention.

With reference to FIGS. 2 and 3, a description will now be made of the SLM technique and the PTS technique, respectively.

FIG. 2 is a diagram illustrating an apparatus for reducing the PAPR of a signal using an SLM technique according to an embodiment of the present invention.

Referring to FIG. 2, the SLM technique-based PAPR reduction apparatus includes a symbol generator 202 for generating symbols by dividing input data by a predetermined length, a serial-to-parallel (S/P) converter 204 for converting a serial input signal into a parallel signal, and multiple multipliers, multiple Inverse Discrete Fourier Transform (IDFT)

units 206-1 to 206-U, and a selector 208 for selecting a signal having the minimum PAPR value.

A symbol output from the symbol generator 202 is input to the serial-to-parallel converter 204 where it is converted into U parallel symbols. Thereafter, the U parallel symbols are multiplied by phase sequences B(1) to B(U), magnitudes of which are 1 and phases of which have any one of a plurality of predetermined values, and then input to the IDFT units 206-1 to 206-U. The IDFT units 206-1 to 206-U each perform IDFT calculation on their input symbols, and output the calculation results to the selector 208. The selector 208 calculates PAPR for each symbol, selects a symbol having the minimum PAPR value, and transmits the selected symbol.

That is, the SLM technique is a technique for multiplying U data blocks by different phase sequences having a particular length, selecting a symbol having the minimum PAPR value among them, and transmitting the selected symbol.

FIG. 3 is a diagram illustrating an apparatus for reducing the PAPR of a signal using a PTS technique according to an embodiment of the present invention.

Referring to FIG. 3, the apparatus for reducing the PAPR of a signal using a PTS technique includes a block generator 302, a serial-to-parallel converter 304, a sub-block divider 306, M IDFT units 308-1 to 308-M, a phase factor selector 310, and a summer 312.

The PTS technique is a technique for dividing an input signal into M sub-blocks, performing L-point IFFT/IDFT on each of them, multiplying the sub-blocks by phase factors b1 to bM for minimizing PAPR, and then summing up the results before transmission.

Figure 4:
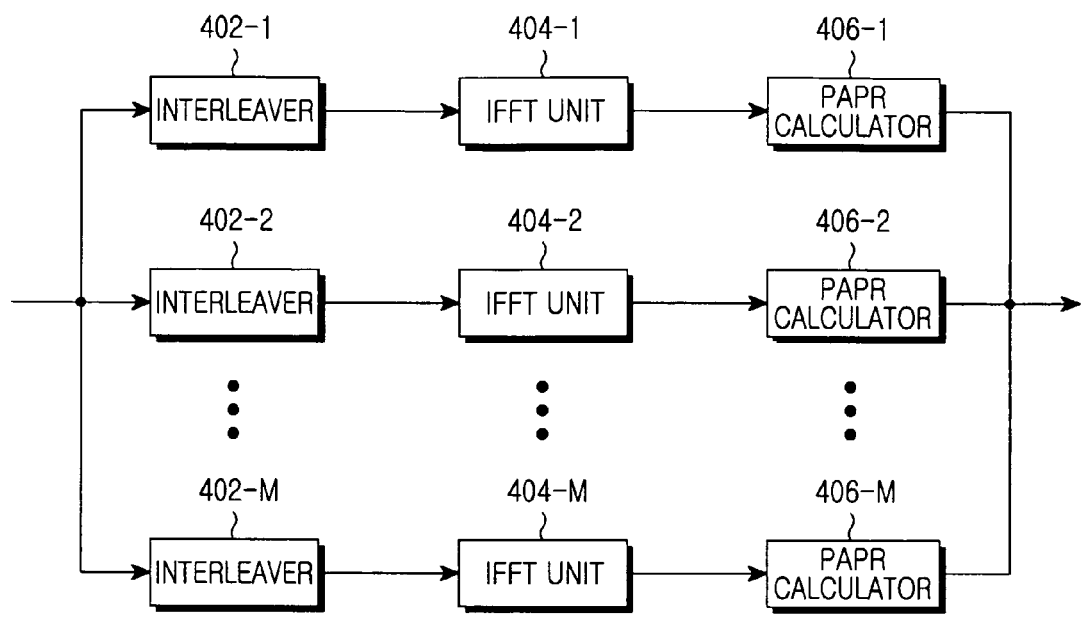
FIG. 4 is a diagram illustrating an apparatus for reducing the PAPR of a signal using an interleaving technique according to an embodiment of the present invention.

FIG. 4 is a diagram illustrating an apparatus for reducing the PAPR of a signal using an interleaving technique according to an embodiment of the present invention.

Referring to FIG. 4, a frequency-domain OFDM symbol is divided into M symbols, and the divided symbols are interleaved by M interleavers 402-1 to 402-M, and then input to IFFT units 404-1 to 404-M, respectively. The IFFT units 404-1 to 404-M transform the frequency-domain OFDM symbols into time-domain OFDM symbols, and output the results to PAPR calculators 406-1 to 406-M, respectively. A transmitter selects a symbol having the minimum PAPR value among the PAPR values calculated by the PAPR calculators 406-1 to 406-M, and transmits the selected symbol.

Figure 5:
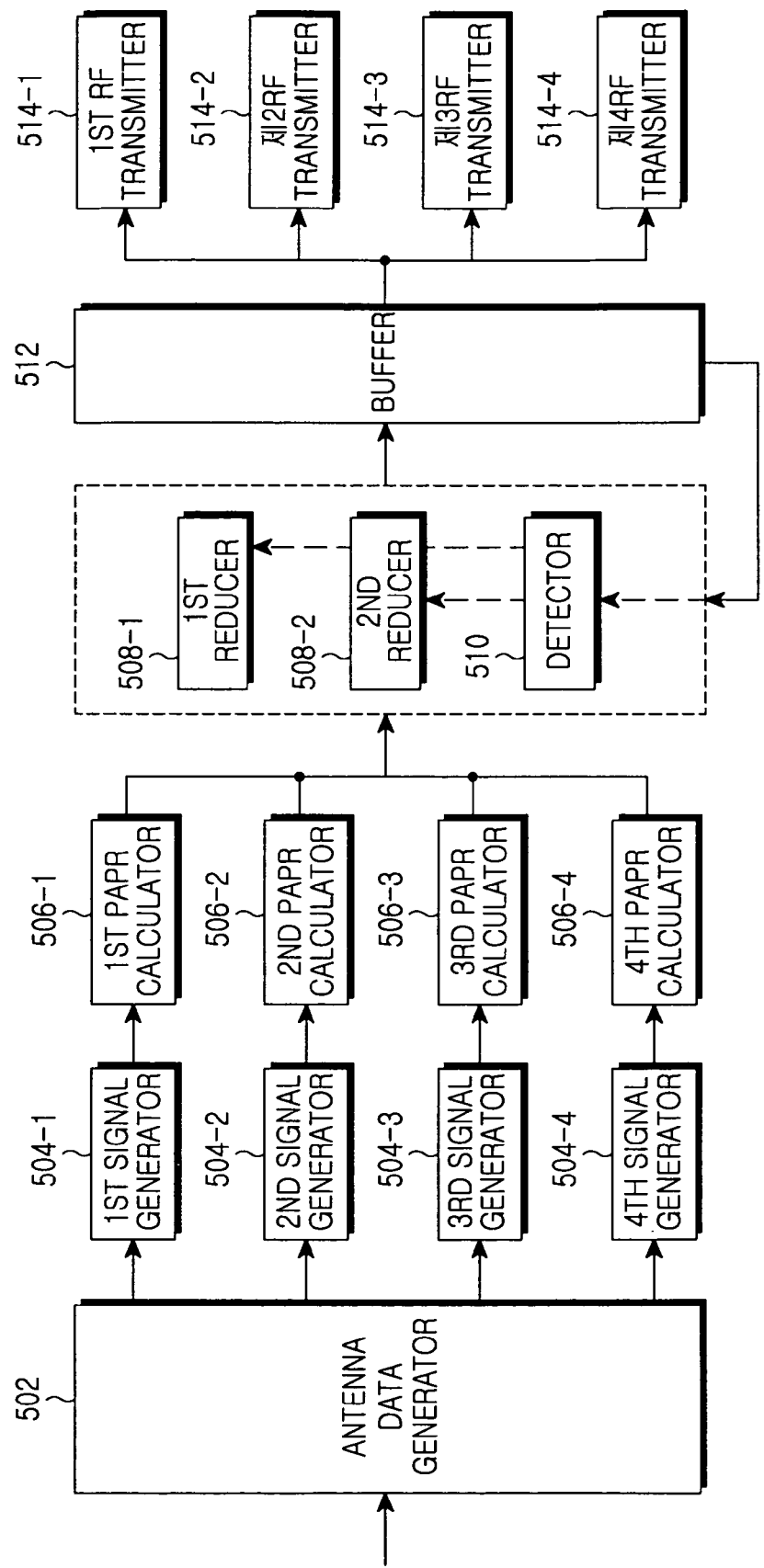
FIG. 5 is a diagram illustrating a transmitter structure with four transmit antennas according to an embodiment of the present invention.

FIG. 5 is a diagram illustrating a transmitter structure having four transmit antennas and two reducers according to an embodiment of the present invention.

Referring to FIG. 5, upon receipt of data, an antenna data generator 502 of the transmitter generates data symbols that it will transmit via the transmit antennas, and outputs the generated data symbols to a first signal generator 504-1 through a fourth signal generator 504-4, respectively.

The first signal generator 504-1 through the fourth signal generator 504-4 generate signals by applying a predetermined coding scheme and modulation scheme to their input data symbols, and output the results to PAPR calculators 506-1 through 506-4, respectively.

The PAPR calculators 506-1 through 506-4 calculate the PAPR of their input signals, and output the results to a first reducer 508-1, a second reducer 508-2, and a detector 510. Alternatively, the first reducer 508-1 and the second reducer 508-2 can be realized with one reducer. When the number of reducers is one, the transmitter can reduce only the PAPR value of a signal having the maximum PAPR value, and when the number of reducers is two, the transmitter can simultaneously reduce PAPR values of both a signal having the maximum PAPR value and a signal having the second-highest PAPR value. Meanwhile, when the number of reducers is two or more, the multiple reducers can also perform PAPR reduction on the same signal.

The detector 510 detects a signal having the maximum PAPR value and a signal having the second-highest PAPR value. If a PAPR value of at least one of the detected signals is greater than a predetermined reference PAPR value as a result of the detection, the detector 510 transfers a control signal for reducing a PAPR value of the corresponding signal to at least one of the first reducer 508-1 and the second reducer 508-2. The corresponding reducer, which has received the control signal, reduces a PAPR value of the corresponding signal by applying a PAPR reduction technique. PAPR values of the antenna signals are determined considering the reduced PAPR values output from the first reducer 508-1 and the second reducer 508-2, and PAPR-reduced transmission signals for the antennas are stored in a buffer 512. The detector 510 compares the PAPR values of signals for the antennas, stored in the buffer 512, with the reference PAPR value.

The foregoing operation of detecting the signal having a PAPR value greater than the reference PAPR value and reducing PAPR of the corresponding signal is repeated a predetermined number times, or repeated until a PAPR value of the signal is less than or equal to the reference PAPR value. Thereafter, Radio Frequency (RF) transmitters 514-1 through 514-4 associated with the antennas transmit the PAPR-reduced signals.

Figure 6:
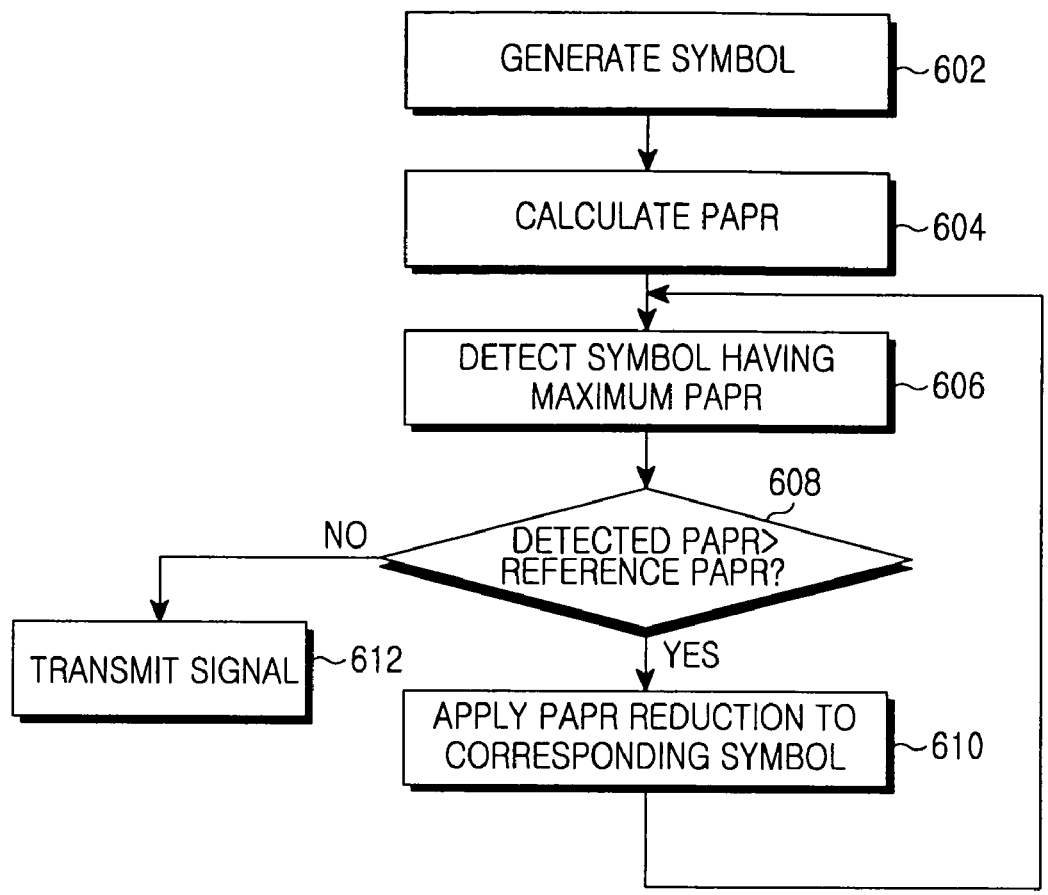
FIG. 6 is a flowchart illustrating a PAPR reduction operation of a base station according to an embodiment of the present invention.

FIG. 6 is a flowchart illustrating a PAPR reduction operation of a base station having multiple transmit antennas according to an embodiment of the present invention.

Referring to FIG. 6, in step 602, the base station generates symbols it will transmit via the antennas. In step 604, the base station calculates the PAPR for each symbol. In step 606, the base station detects a symbol having the maximum PAPR value. In step 608, the base station determines if the PAPR value of the detected symbol exceeds a predetermined reference PAPR value. If it is determined that the PAPR value of the detected symbol exceeds the reference PAPR value, the base station reduces in step 610 the PAPR by applying a PAPR reduction technique to the corresponding symbol, and returns to step 606. However, if the PAPR value of the detected symbol is less than or equal to the reference PAPR value, the base station transmits symbols via their associated transmit antennas in step 612.

Meanwhile, when the present invention uses the SLM technique as a PAPR reduction technique, the transmitter generates time-domain transmission signals for the transmit antennas through OFDM modulation, and measures the PAPR for the generated signals. Thereafter, if a PAPR value of the signal transmitted from an n'th transmit antenna is greatest, the transmitter changes the signal into frequency-domain OFDM symbols while applying predetermined phase sequences thereto one by one, performs IFFT thereon to obtain a time-domain signal, and calculates the PAPR for the signal. If a PAPR value of the signal transmitted from the n'th transmit antenna after a predetermined number of PAPR calculations is less than PAPR of the signal transmitted from an n'th transmit antenna that has had the second-highest PAPR value, the transmitter repeats the same process while applying phase sequences to the signal transmitted from an n'th transmit antenna one by one.

Figure 7:
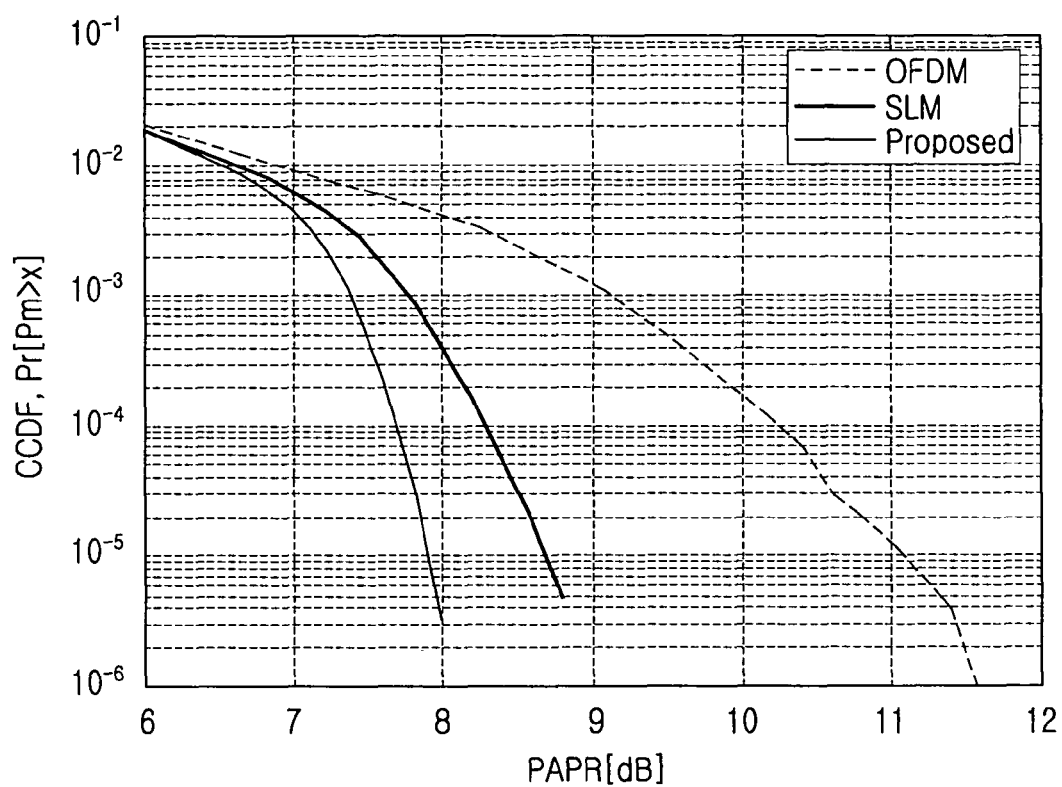
FIG. 7 is a graph illustrating a comparison between the PAPR reduction performance by the proposed scheme and the PAPR reduction performance by the conventional scheme, both obtained when the number of PAPR reducers is four and PAPR reduction calculation is performed three times.
Figure 8:
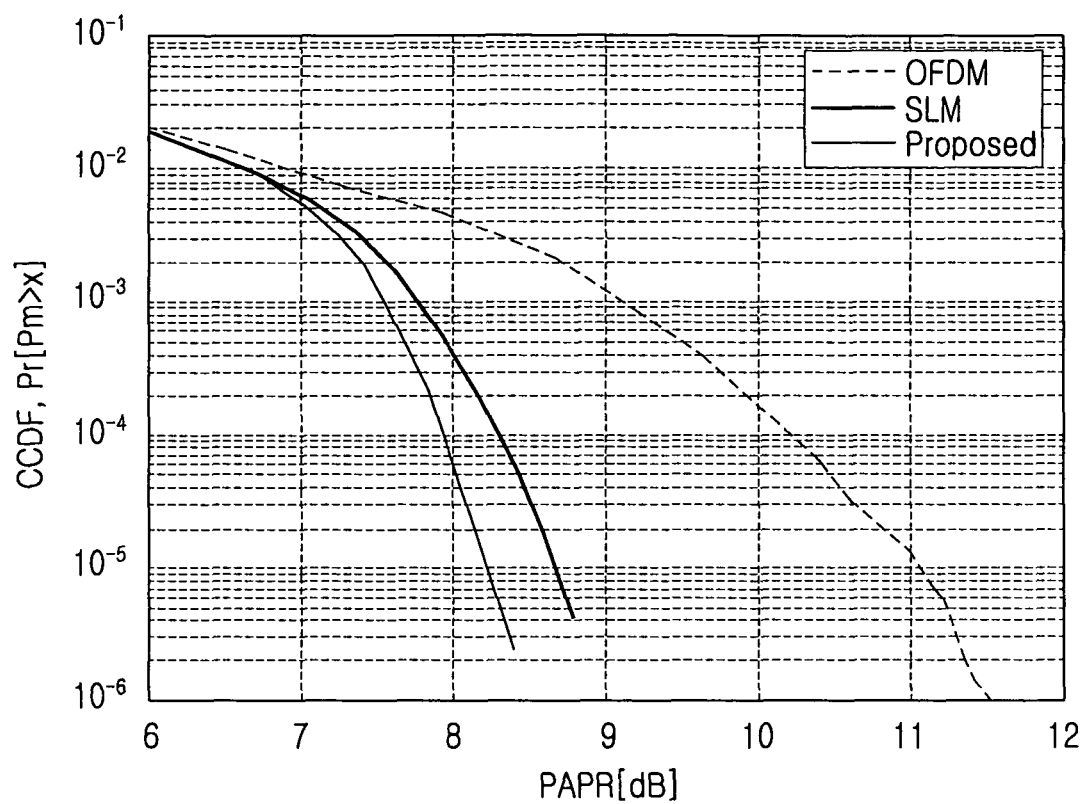
FIG. 8 is a graph illustrating a comparison between the PAPR reduction performance by the proposed scheme and the PAPR reduction performance by the conventional scheme, obtained when the number of PAPR reducers is four and the PAPR reduction calculation is performed two times in the proposed scheme and three times in the conventional scheme.
Figure 9:
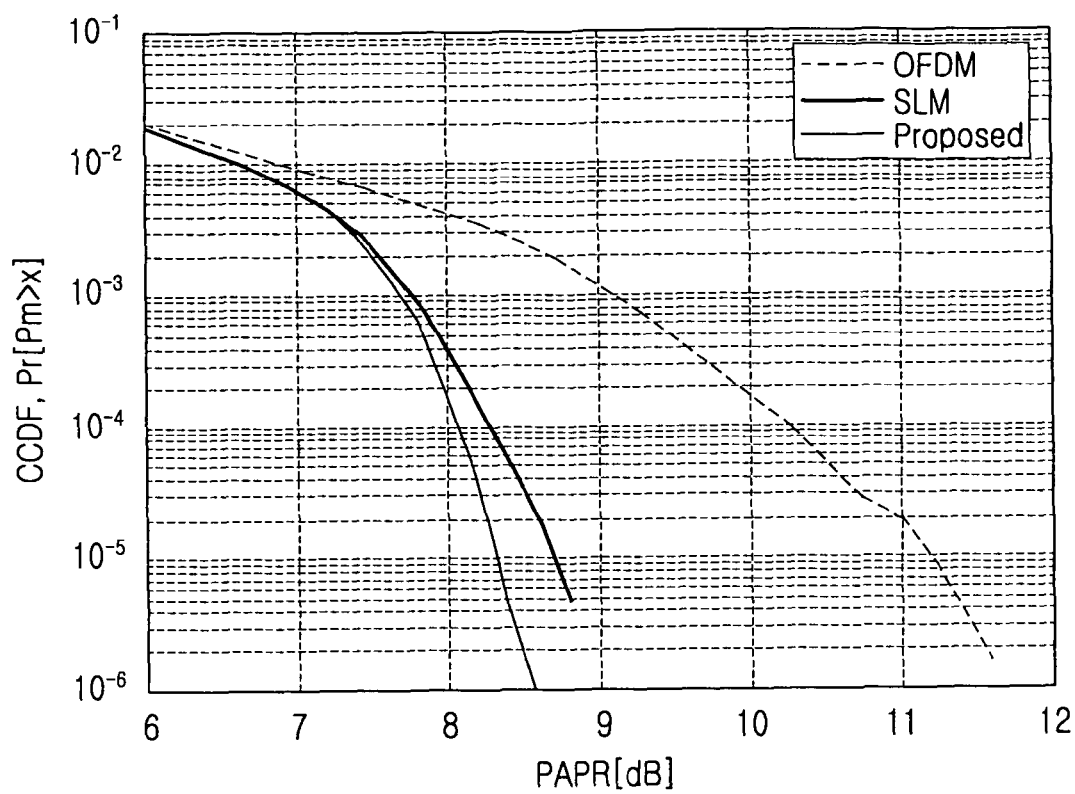
FIG. 9 is a graph illustrating a comparison between the PAPR reduction performance by the proposed scheme and the PAPR reduction performance by the conventional scheme, both obtained when the number of PAPR reducers is two and the PAPR reduction calculation is performed three times.

FIGS. 7 to 9 are graphs illustrating comparisons between the PAPR reduction performance by the proposed scheme and the PAPR reduction performance by the conventional scheme. In FIGS. 7 to 9, the X-axis represents a PAPR value, and the Y-axis represents a clipping probability that a time-domain signal sample will exceed a particular PAPR value.

Here, the PAPR value represents the maximum PAPR value among the PAPR value of four transmit antennas.

FIG. 7 is a graph illustrating a comparison between the PAPR reduction performance by the proposed scheme and the PAPR reduction performance by the conventional scheme, both obtained when the number of PAPR reducers is four and PAPR reduction calculation is performed three times.

Shown in FIG. 7 are performances acquired when a PAPR reduction technique is additionally applied three times (i.e., three additional phase sequences are used) for both the case where the SLM technique is applied to the transmit antennas and the case where the proposed technique is applied to the transmit antennas. In this case, it can be appreciated that the processing time and the complexity of the PAPR reduction unit due to the PAPR reduction remain unchanged, but a PAPR value for achieving a clipping probability of 1e-4 is improved by 0.5 dB or more.

FIG. 8 is a graph illustrating a comparison between the PAPR reduction performance by the proposed scheme and the PAPR reduction performance by the conventional scheme obtained when the number of PAPR reducers is four and the PAPR reduction calculation is performed two times in the proposed scheme and three times in the conventional scheme.

Shown in FIG. 8 are performances acquired when the proposed PAPR reduction technique is applied two times, and the calculation complexity for the case where the SLM technique is applied to the transmit antennas remains as in FIG. 7. In this case, the processing time delay due to the PAPR reduction can be reduced even when the hardware complexity of the PAPR reducer is constant, and the PAPR value for achieving a clipping probability of 1e-4 is improved by 0.3 dB or more.

FIG. 9 is a graph illustrating a comparison between the PAPR reduction performance by the proposed scheme and the PAPR reduction performance by the conventional scheme, both obtained when the number of PAPR reducers is two and the PAPR reduction calculation is performed three times.

As shown in FIG. 9, when the number of PAPR reducers is two and the PAPR reduction technique is applied three times, the PAPR value for achieving a clipping probability of 1e-4 is improved by 0.2 dB or more. In addition, though the time delay due to the PAPR reduction is constant, the complexity of the PAPR reduction unit can be reduced.

As is apparent from the foregoing description, the present invention can noticeably reduce the PAPR of a signal while having the same hardware complexity and processing delay time as that of the conventional PAPR reduction apparatus and method. In addition, the present invention can reduce the processing delay time while having the same hardware complexity and PAPR reduction performance as that of the conventional PAPR reduction apparatus and method. Further, the present invention can reduce the hardware complexity while having the same processing delay time and PAPR reduction performance as that of the conventional PAPR reduction apparatus and method. The apparatus and method proposed by the present invention can be efficiently applied to a wireless communication system having multiple antennas.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A peak-to-average power ratio (PAPR) reduction apparatus in a wireless communication system having multiple transmit antennas, the PAPR reduction apparatus comprising:
   a symbol generator configured to generate symbols to be transmitted via the multiple transmit antennas;
   a PAPR calculator configured to calculate a PAPR value for each of the generated symbols;
   a detector configured to detect a maximum PAPR value among the PAPR values of the generated symbols; and
   a PAPR reducer configured to receive, when the detected maximum PAPR value exceeds a reference PAPR value, a control signal to reduce a PAPR value of a corresponding symbol and to reduce the PAPR value of the corresponding symbol upon receipt of the control signal.

2. The PAPR reduction apparatus of claim 1, further comprising a controller configured to output the control signal to reduce the PAPR value of the corresponding symbol and to output no control signal for PAPR reduction when a number of PAPR reductions performed by the PAPR reducer exceeds a predetermined number.

3. The PAPR reduction apparatus of claim 1, further comprising a controller configured to output the control signal to reduce the PAPR value of the corresponding symbol and to output wherein a control signal for stopping a PAPR reduction operation to the PAPR reducer when a number of PAPR reductions performed by the PAPR reducer exceeds a predetermined number.

4. The PAPR reduction apparatus of claim 1, wherein the symbols are Orthogonal Frequency Division Multiplexing (OFDM) symbols.

5. The PAPR reduction apparatus of claim 1, wherein the PAPR reducer is configured to reduce a PAPR value of a symbol using at least one from the group consisting of a clipping & filtering technique, a selective mapping (SLM) technique, a partial transmit sequence (PTS) technique, an interleaving technique, and a tone reservation technique.

6. The PAPR reduction apparatus of claim 1, wherein the PAPR reducer is further configured to receive, when the detected maximum PAPR value is less than the reference PAPR value, no control signal to reduce a PAPR value of the corresponding symbol.

7. The PAPR reduction apparatus of claim 1, wherein the detector is further configured to generate the control signal to reduce the PAPR value of the corresponding symbol, further comprising:
   a buffer configured to store the corresponding symbol, a PAPR value of which is reduced by the PAPR reducer.

8. A method for reducing a peak-to-average power ratio (PAPR) by a PAPR reduction apparatus in a wireless communication system having multiple transmit antennas, the method comprising:
   generating by the PAPR reduction apparatus symbols to be transmitted via the multiple transmit antennas;
   calculating by the PAPR reduction apparatus a PAPR value for each of the generated symbols;
   detecting by the PAPR reduction apparatus a maximum PAPR value among the calculated PAPR values of the symbols; and
   reducing by the PAPR reduction apparatus the PAPR value of the corresponding symbol when the detected maximum PAPR value exceeds a reference PAPR value.

9. The method of claim 8, wherein reducing by the PAPR reduction apparatus the PAPR value of the corresponding symbol comprises:
   repeating by the PAPR reduction apparatus the PAPR reduction until a number of PAPR reductions performed by the PAPR reduction apparatus exceeds a predetermined number.

10. The method of claim 8, wherein the symbols are Orthogonal Frequency Division Multiplexing (OFDM) symbols.

11. The method of claim 8, wherein reducing by the PAPR reduction apparatus the PAPR value comprises using by the PAPR reduction apparatus at least one technique from the group consisting of a clipping & filtering technique, a selective mapping (SLM) technique, a partial transmit sequence (PTS) technique, an interleaving technique, and a tone reservation technique.

12. The method of claim 8, further comprising:
refraining by the PAPR reduction apparatus from reducing a PAPR value of the corresponding symbol when the detected maximum PAPR value is less than the reference PAPR value.

13. The method of claim 8, further comprising:
storing by the PAPR reduction apparatus the corresponding symbol, a PAPR value of which is reduced.

14. A method for reducing a peak-to-average power ratio (PAPR) by a PAPR reduction apparatus in a wireless communication system having multiple transmit antennas, the method comprising:
generating by the PAPR reduction apparatus one or more symbols to be transmitted through the multiple transmit antennas;
calculating by the PAPR reduction apparatus a PAPR value for each of the one or more symbols;
determining by the PAPR reduction apparatus a maximum PAPR value among the PAPR values of the symbols; and
receiving by the PAPR reduction apparatus a control signal to reduce a PAPR value of a corresponding symbol when the maximum PAPR value exceeds a reference PAPR value.

15. The method of claim 14, further comprising:
reducing by the PAPR reduction apparatus the PAPR value of the corresponding symbol upon receipt of the control signal.

16. The method of claim 15, wherein reducing by the PAPR reduction apparatus the PAPR value of the corresponding symbol comprises:
repeating by the PAPR reduction apparatus the PAPR reduction until a number of PAPR reductions performed by the PAPR reduction apparatus exceeds a predetermined number.

17. The method of claim 15, wherein reducing by the PAPR reduction apparatus the PAPR value comprises using by the PAPR reduction apparatus at least one technique from the group consisting of a clipping & filtering technique, a selective mapping (SLM) technique, a partial transmit sequence (PTS) technique, an interleaving technique, and a tone reservation technique.

18. The method of claim 14, wherein the symbol is an Orthogonal Frequency Division Multiplexing (OFDM) symbol.

19. The method of claim 14, further comprising:
receiving by the PAPR reduction apparatus no control signal to reduce the PAPR value of the corresponding symbol when the maximum PAPR value is less than the reference PAPR value.

20. The method of claim 14, further comprising:
storing by the PAPR reduction apparatus the corresponding symbol, a PAPR value of which is reduced.

* * * * *